United States Patent [19]
Leger

[11] 3,783,444
[45] Jan. 1, 1974

[54] METHOD AND APPARATUS FOR USE IN INVESTIGATING EARTH FORMATIONS
[75] Inventor: Geary L. Leger, Yucaipa, Calif.
[73] Assignee: Schlumberger Technology Corporation, New York, N.Y.
[22] Filed: Aug. 1, 1969
[21] Appl. No.: 846,907

[52] U.S. Cl.............. 340/18 CM, 181/.5 BI, 324/1
[51] Int. Cl............................................. G01v 1/40
[58] Field of Search....................... 324/1; 181/.5; 340/18

[56] References Cited
UNITED STATES PATENTS

| | | | |
|---|---|---|---|
| 3,292,729 | 12/1966 | Blizard.................................. | 181/.5 |
| 3,302,165 | 1/1967 | Anderson et al..................... | 340/18 |
| 3,311,876 | 3/1967 | Lee....................................... | 340/18 |
| 3,406,359 | 10/1968 | Welz et al............................. | 324/1 |
| 3,456,754 | 7/1969 | Zemanek, Jr......................... | 181/.5 |

Primary Examiner—Benjamin A. Borchelt
Assistant Examiner—N. Moskowitz
Attorney—Ernest R. Archambeau, Jr., Jerry M. Presson, Stewart F. Moore, David L. Moseley, Edward M. Roney, James C. Kesterson, William R. Sherman and Michael J. Berger

[57] ABSTRACT

In accordance with an illustrative embodiment of the present invention, a well tool having first and second exploring means is moved through a borehole for investigating the media surrounding the well tool. The first exploring device produces pulses whose rate is representative of a formation parameter. The second exploring means, on the other hand, includes an energy emitting transmitter and two nearby energy receiving receivers. This transmitter is periodically energized to emit energy into the surrounding media and a sync pulse representative of the time of such energy emission is produced for transmission to the surface of the earth. The signals produced by each receiver are transmitted to the surface of the earth on alternate emissions of energy. All of these above-mentioned signals from both exploring means are transmitted on a common transmission channel. The pulses from the first exploring means are inhibited from transmission for a predetermined time interval prior to the transmission of each sync pulse until after a receiver signal has been transmitted. Thus, a transmission dead period results during this predetermined time interval prior to the sync pulse transmission. At the surface of the earth, a detector circuit is repsonsive to the periodic nature of the sync pulses plus the transmission dead period for detecting each sync pulse. To identify which receiver produced each receiver signal, the time interval between the sync pulses and their corresponding receiver signals are measured and compared.

20 Claims, 17 Drawing Figures

Geary L. Leger
INVENTOR

BY Edward M. Roney
ATTORNEY

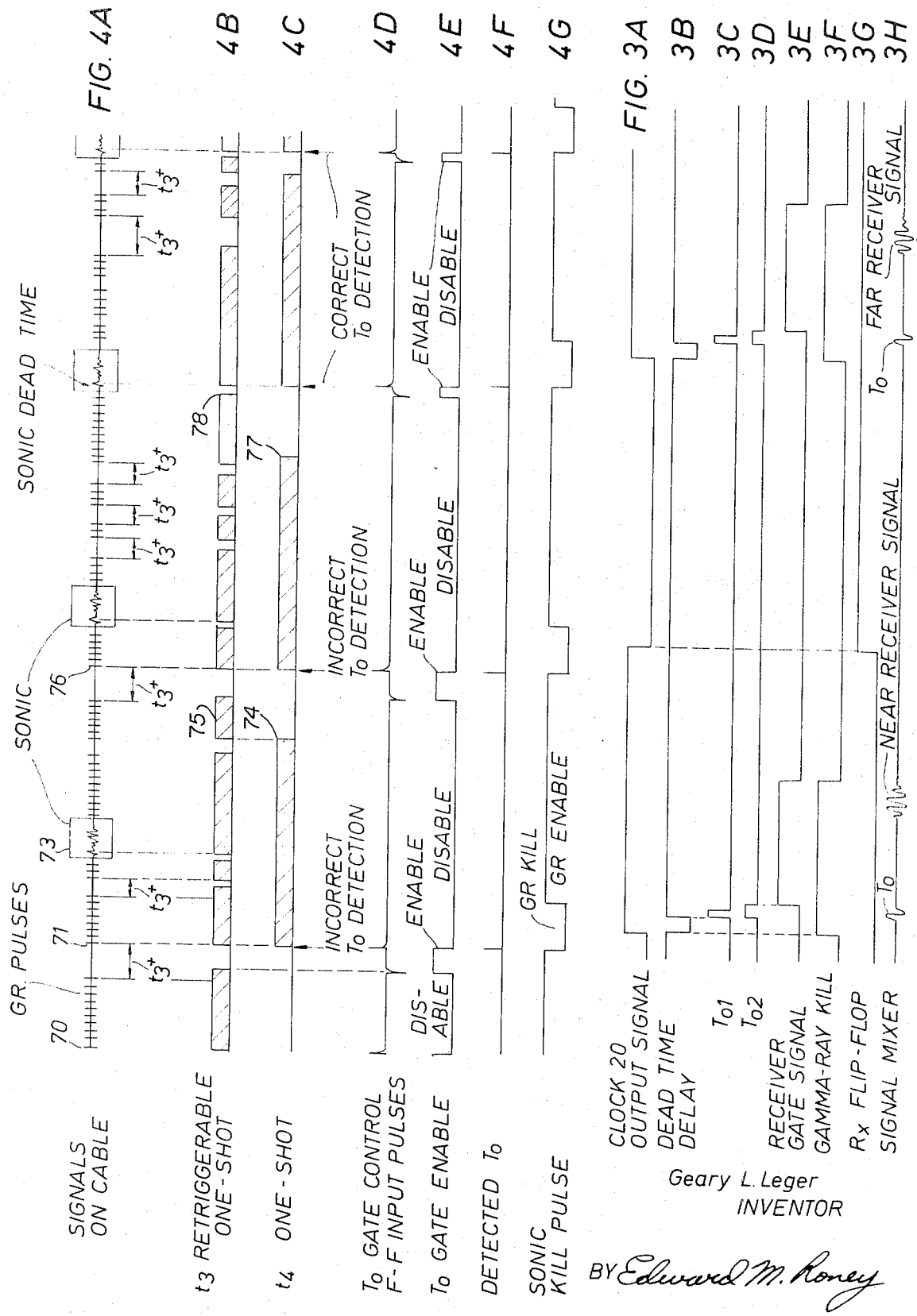

METHOD AND APPARATUS FOR USE IN INVESTIGATING EARTH FORMATIONS

This invention relates to methods and apparatus for use in investigating earth formations and, more particularly, to methods and apparatus for transmitting information derived from a plurality of information sources in a well tool supported in a borehole on the end of a cable to the surface of the earth over a common transmission channel and accurately detecting the transmitted information at the surface of the earth.

After a borehole is drilled into the earth, there are a multitude of exploring devices which can be passed through the borehole to log the adjoining formation, or the casing surrounding the borehole if the borehole is cased. For example, in copending application Ser. No. 89,507 filed by Fred W. Zill on Nov. 18, 1970 which is a continuation of application Ser. No. 796,293 filed on Jan. 22, 1969, which application is a continuation of application Ser. No. 710,279, filed on Mar. 4, 1968, an acoustic exploring device having one acoustic transmitter and two spaced apart acoustic receivers is mounted on the same support member with a gamma-ray exploring device and a casing collar locating device. The acoustic transmitter is repetitively energized and the electrical signal produced by each of the acoustic receivers in response to acoustic energy received thereby is sequentially processed for transmission to the surface of the earth. To identify which receiver signal is being transmitted at any given time, a sequence identification signal is also transmitted for each receiver signal. Moreover, in this prior Zill system, the gamma-ray and casing collar locator signals are also sequentially processed for transmission during each sequence of operation. At the surface of the earth, the identification signals are utilized to identify each sequence of signals as they arrive at the surface of the earth to enable proper separation of these signals.

While this prior Zill system operates satisfactorily to transmit information from a plurality of different sources over a common transmission channel, the electronics utilized in this prior system are somewhat complicated. This is especially true for the downhole electronics which operates to sequentially process all of the signals derived from the various exploring devices.

In this connection, a subsequent simpler system was proposed by the same inventor, Fred W. Zill, for transmitting all of this information to the surface of the earth on the same transmission channel and separating the various signals for subsequent processing by the surface electronics. In this subsequent Zill system, the well tool operated to transmit a sync pulse representative of the time that the acoustic transmitter is energized and to inhibit transmission of pulses produced by the gamma-ray exploring device for a fixed time interval prior to the transmission of each sync pulse. These sync pulses could then be detected at the surface of the earth because of the periodic nature of these sync pulses and the transmission dead time prior to the transmission of each sync pulse. However, the Zill detector circuit was rather elaborate.

It is therefore an object of the present invention to provide a simplified circuit for detecting these periodic sync pulses.

To identify which receiver produced a receiver signal being transmitted to the surface of the earth at any given time, the second Zill case produced a second sync pulse for transmission a fixed time interval after the first sync pulse was transmitted whenever a signal derived from a selected one of the receivers was transmitted. For the other receiver, only 1 sync pulse was transmitted. For more information concerning this subsequent Zill system, refer to copending application Ser. No. 846,908, filed by Fred W. Zill on Aug. 1, 1969.

It is another object of the present invention to provide new and improved methods and apparatus for identifying the receiver signals without having to transmit identification signals from the well tool.

Generally, it is an object of the present invention to provide new and improved methods and apparatus for use with well logging equipment lowered in a borehole drilled into the earth.

In accordance with one feature of the present invention, apparatus for detecting a periodically occurring pulse transmitted from a remote location on the same transmission channel and frequency band with a plurality of other pulses, where the periodic pulse is always preceded by a dead period defined by an absence of transmitted pulses in the frequency band, comprises means for receiving the transmitted pulses and passing all pulses on the frequency band of the periodic pulses. The apparatus further comprises retriggerable pulse generating means responsive to the passed pulses for generating a first control signal having a first given time duration which is less than the transmission dead period. This retriggerable means is adapted to restart its timing cycle in response to each incident triggering pulse. The first given time duration is less than the transmission dead period. The apparatus also includes detecting means responsive to an enabling signal for detecting a selected passed pulse as one of the periodic pulses and timing means responsive to the detected periodic pulse for producing a second control signal which terminates a second given time interval after the timing means is energized by one of the detected periodic pulses. This second given time interval is less than the time interval between successive ones of the periodic pulses. The apparatus further includes means responsive to the first and second control signal for enabling the detecting means to detect a passed pulse as one of the periodic pulses.

In accordance with another feature of the present invention, methods and apparatus are set forth for identifying receiver signals produced by a well logging system of the type where energy is emitted from a transmitter and received by at least two nearby receivers which individually produce signals representative of the received energy for transmission to the surface of the earth on selected occurrences of energy emission. The well logging system also produces a sync pulse representative of the time of energy emission for transmission to the surface of the earth. The sync pulse and received energy signals are detected and the time interval between each detected sync pulse and a subsequent detected received energy signal is measured. The time interval pulses representative of this time interval are generated to enable identification of which receiver produced each received energy signal. This identification is brought about by comparing the rleationship of the time interval pulses to one another.

For a better understanding of the present invention, together with other and further objects thereof, reference is had to the following description taken in connection with the accompanying drawings, the scope of the invention being pointed out in the appended claims.

Referring to the drawings:

FIGS. 3A–3H show waveform timing diagrams useful in explaining the operation of the downhole circuitry of FIG. 1; and FIGS. 4A–4C show waveform timing diagrams useful in explaining the operation of the surface electrical circuitry of FIG. 2.

Figure 1:
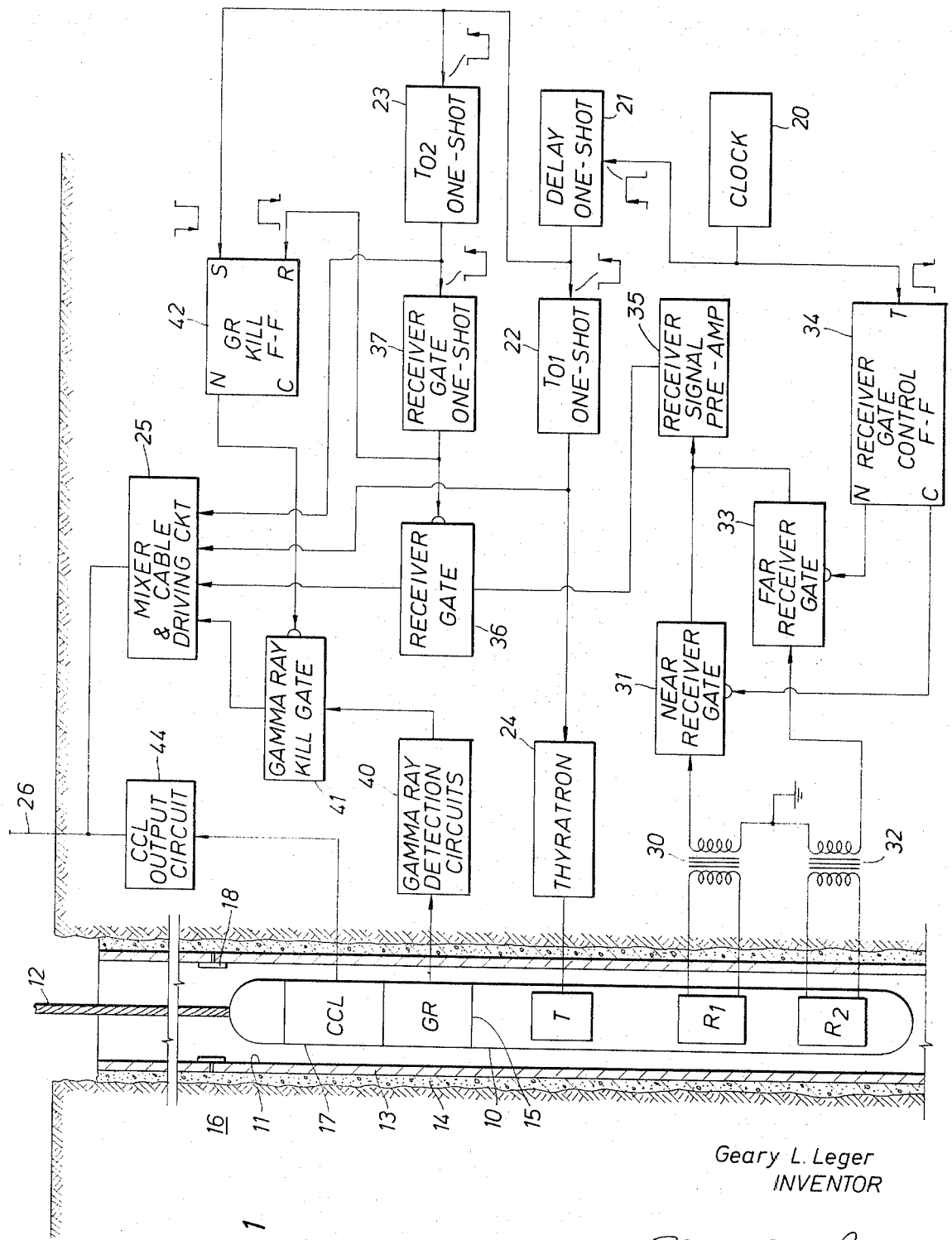
FIG. 1 shows a well tool in a borehole along with a schematic representation of the downhole electrical circuitry used with the present invention.

Now referring to FIG. 1, there is shown a well logging tool 10 supported in a borehole 11 on the end of a cable 12. In this embodiment, the well 11 is cased with a casing 13 surrounded by cement 14. The well logging tool 10 includes an acoustic exploring device comprising an acoustic transmitter T and two spaced apart acoustic receivers $R_1$ and $R_2$. The tool further includes a natural gamma-ray detector 15 which desirably includes a scintillation counter for producing pulses at a rate proportional to the natural gamma-ray content of the formations 16 surrounding the borehole 11. The tool further includes a casing collar locator 17 which operates to detect the presence of casing collars, such as that indicated by the reference number 18. The output signal from the casing collar locator 17 is desirably in the form of a DC signal which varies at a very slow, but detectable rate whenever the tool 10 passes a casing collar.

Now concerning the downhole electrical circuitry and first concerning the acoustic portion of the downhole electrical circuitry refer to FIGS. 1 and 3A–3H in conjunction. A free running oscillator or clock 20 produces the square wave output signal of period $t_1$ shown in FIG. 3A for controlling the operation of the downhole electronics. The rising edges of this clock signal energizes a delay one-shot 21 whose pulse output of period $t_2$ is shown in FIG. 3B. The trailing edge of each pulse from the delay one-shot 21 energizes a pair of one-shots 22 and 23, designated respectively "$T_{01}$ one-shot" and "$T_{02}$ one-shot". The resulting $T_{01}$ and $T_{02}$ pulses are shown in FIGS. 3C and 3D respectively. The $T_{01}$ output pulse energizes a thyratron 24 which supplies a burst of high energy to the acoustic transmitter T to cause acoustic energy to be emitted into the media surrounding the well tool 10. To inform the surface electronics as to the time of this energy emission, both the positive going $T_{01}$ pulse and negative going $T_{02}$ pulse are applied to a mixer and cable driving circuit 25 which combines these $T_{01}$ and $T_{02}$ pulses for application to the cable conductor 26 to be transmitted to the surface of the earth. The armor of the cable 12 acts as the current return for current on the cable conductor 26. The amplitude of the negative going $T_{02}$ pulse is one-half the amplitude of the $T_{01}$ pulse such that the combination of these two pulses, as seen by comparing FIGS. 3C and 3D, will produce a pulse doublet having an initial positive portion followed by a negative portion. The $T_0$ signal which appears on the cable conductor 26 is shown in FIG. 3H.

The acoustic energy emitted from the transducer T travels through the surrounding media including the mud column (casing, and cement, if the borehole is cased) and formations and arrives at the near and far acoustic receivers $R_1$ and $R_2$. The acoustic receivers $R_1$ and $R_2$ produce electrical signals representative of the acoustic energy impinging on these two receivers. The electrical signal produced by the near receiver $R_1$ is passed via a transformer 30 to a near receiver gate 31 and the electrical signal produced by the far receiver $R_2$ is passed via a transformer 32 to a far receiver gate 33. To control the opening of the gates 31 and 33, the trailing or falling edges of the clock signal from the clock source 20 trigger a trigger flip-flop 34. The normal output of this flip-flop 34 opens the far receiver gate 33 and the complementary output thereof opens the near receiver gate 31. By this arrangement, it can be seen that the near and far receiver gates 31 and 33 will be opened on alternate cycles of operation where one cycle corresponds to the time between each energization of the acoustic transmitter T.

Whichever receiver signal is selected is passed via a preamplifier 35, designated "receiver signal preamp," and a receiver gate circuit 36 to another input of the mixer and cable driving circuit 25. To open the receiver gate 36, the trailing edge of the $T_{02}$ pulse from one-shot 23 energizes a one-shot 37, designated "receiver gate one-shot." The resulting pulse output from the receiver gated one-shot 37, shown in FIG. 3E, opens the receiver gate circuit 36 to pass the selected receiver signal to the mixer and cable driving circuit 25. By this arrangement, the receiver gate circuit 36 will only be opened to pass the selected receiver signal during a time interval when the receiver signal is expected, to thereby minimize the possibility of noise such as cross-talk from the $T_0$ pulse from being passed as a received energy signal.

Now concerning the gamma-ray channel of the downhole electronics, the scintillation counter 15 produces pulses proportional to the natural gamma-ray content of the adjoining formations, which pulses are applied to suitable gamma-ray detection circuits 40. The make-up of these gamma-ray detection circuits are well known in the art and can take the form of buffering circuits to isolate the detection circuits 40 from the scintillation counter 15, threshold circuits that operate to accept only authentic gamma-ray pulses, and scaling circuits for counting the gamma-ray pulses down by a selected factor. The positive polarity processed gamma-ray pulses are applied to the mixer and cable driving circuit 25 for transmission to the surface of the earth via a "gamma-ray kill gate" 41. To energize the gamma-ray kill gate, the leading edges of the delay pulses of FIG. 3B from the delay one-shot 21 set a flip-flop 42, designated "gamma-ray kill flip-flop," and the trailing edges of the receiver gate pulses from the one-shot 37 reset this flip-flop. The resulting gamma-ray kill signal from the flip-flop 42 is shown in FIG. 3F.

Comparing FIGS. 3A–3H, it can be seen that the gamma-ray pulses are inhibited from being applied to the cable from a time beginning with the rising edge of the clock pulse of FIG. 3A until after the transmission of the receiver signal of FIG. 3H to the surface of the earth. Since the $T_0$ pulse cannot be transmitted until termination of the dead time delay $t_2$ shown in FIG. 3B, it can be seen that there will be no signal transmission of either sonic or gamma-ray signals during this time interval $t_2$. It is this dead time interval $t_2$ and the known time interval $t_1$ between transmitted $T_0$ pulses that enables the surface electronics to distinguish the $T_0$ pulses from all of the other transmitted signals on the cable.

In addition to the above-described signal transmission, the casing collar locator 17 produces a DC type output signal to a casing collar locator output circuit 44 which amplifies the casing collar signal and applies it between the cable conductor 26 and the cable armor for transmission to the surface of the earth. It should be mentioned here that the above-mentioned dead time interval only applies to the gamma-ray and sonic signals since the casing collar signals can still be transmitted to the surface of the earth. However, the casing collar locator signals are at a much lower frequency than either the gamma-ray or sonic signals. Thus, this dead time interval only applies to those signals in the frequency band of the sonic signals, i.e., the sonic and gamma-ray signals.

Now concerning the electronic circuitry at the surface of the earth, the casing collar locator signals are applied to suitable casing collar locator circuits 50 via a low-pass filter 51 which filters out the higher frequency sonic and gamma-ray signals. The casing collar locator circuits 50 can take the form of a voltage discriminator to produce an output pulse whenever a casing collar is detected, as well as suitable indicating circuits.

The high frequency sonic and gamma-ray signals are applied to a high-pass filter 52 which discriminates against the casing collar locator signals and uses the higher frequency sonic and gamma-ray signals to an amplifier 53 by way of an adjustable potentiometer 54. This potentiometer 54 can be adjusted to a desired position in accordance with the measured amplitude of the $T_0$ pulses to provide signal normalization. The signals from the amplifier 53, represented in FIG. 4A, are then applied to a "$T_0$ detection circuit" 54a which operates to detect the transmitted $T_0$ pulses. Within this circuit 54a, the signals from the amplifier 53 are applied to the input of a $T_0$ gate 55 and a positive signal detector 56 which could take the form of a Schmitt trigger, if desired. The positive signal detector 56 produces a negative going output pulse in response to each positive signal from the amplifier 53 which exceeds a predetermined amplitude level. Thus, the detector 56 will produce such output pulses in response to both sonic and gamma-ray pulses.

The leading edge of each pulse from the detector 56 energizes a retriggerable one-shot 57 via an OR gate 58. The retriggerable one-shot has a timing cycle of time duration $t_3$, where $t_3$ is somewhat less than the dead time period $t_2$. The timing capacitor of the retriggerable one-shot 57 is charged up to its maximum voltage level in response to each applied input triggering pulse to the one-shot 57 such that the output pulse from the retriggerable one-shot 57 will terminate a time interval $t_3$ after the last incident pulse. The output pulses from the retriggerable one-shot 57, shown in FIG. 4B, are applied to an OR gate 58 and then differentiated by a capacitor 59 and resistor 60. The positive going pulse portions of this differentiated signal are applied to the reset input of a $T_0$ gate control flip-flop 61 via a diode 62 and the negative going pulse portions of this differentiated signal are applied to the set input of the flip-flop 61 via a diode 63. The normal output of the $T_0$ gate control flip-flop 61, represented in FIG. 4E, is utilized to open the $T_0$ gate 55 so as to pass the cable signal from the amplifier 53 to a "$T_0$ detector" 64. This $T_0$ detector could desirably take the form of a Schmitt trigger responsive to negative going pulses. As will be explained later, the output pulses from this $T_0$ detector 64, represented in FIG. 4F, comprise the detected $T_0$ pulses.

The leading edge of each detected $T_0$ pulse energizes a one-shot 65 having a duty cycle of time duration $t_4$, where $t_4$ is slightly less than the period $t_1$ of the downhole clock 20. These positive going detected $T_0$ pulses also reset the $T_0$ gate control flip-flop 61 via a diode 66. The output signal from the $t_4$ one-shot 65, represented in FIG. 4C, is applied to the other input of the OR gate 58 for use in conjunction with the pulses from the $t_3$ retriggerable one-shot 57 for setting and resetting the $T_0$ control flip-flop 61. These $t_4$ pulses are also applied to the OR gate 58 for use in energizing the $t_3$ retriggerable one-shot 57 on the pulse trailing edge. The $T_0$ gate control flip-flop 61 set and reset input pulses are shown in FIG. 4D.

Now concerning how the $T_0$ detection circuit 54a operates to accurately detect the $T_0$ pulses, the $t_2$ dead time interval prior to the transmission of each $T_0$ pulse coupled with the fixed time interval $t_1$ between $T_0$ pulses enables the $T_0$ detection circuit 54a to find these $T_0$ pulses and lock-on them. To understand this operation, it would be best to take a specific example for illustration. Thus, assume that the power is turned on at the time designated by the numeral 70 in FIG. 4A and furthermore assume that there is a gap in transmitted gamma-ray pulses at the locations designated by the reference indication $t_3^+$ ($t_3^+$ signifies that this gap has a time duration greater than $t_3$). From FIG. 4B it can be seen that the $t_3$ retriggerable one-shot will be turned on in response to the first gamma-ray pulse received at the surface of the earth and will turn off a time interval $t_3$ after the last gamma-ray pulse of the first $t_3^+$ gap in FIG. 3A. As discussed earlier, these $t_3$ pulses of FIG. 4B are differentiated to produce the differentiated pulses of FIG. 4D. Since these positive going differentiated pulses reset the $T_0$ gate control flip-flop 61 to disable the $T_0$ detection by disabling the $T_0$ gate 55, it can be seen that no $T_0$ pulses can be detected immediately after the power is turned on until a time interval $t_3$ after the first transmission gap. At this time, as seen in FIG. 4E, the $T_0$ gate is energized to enable the detection of a $T_0$ pulse. The reason for enabling $T_0$ detection at this time is based on the fact that a dead period of time interval $t_2$ always precedes each $T_0$ pulse. Thus, since the retriggerable one-shot 57 has detected such a dead time, the $T_0$ gate 55 is opened to see if this dead time period is, in fact, followed by a $T_0$ pulse. As seen in FIG. 4A, the next pulse after this dead time period is a gamma-ray pulse, designated 71. Since the $T_0$ detection circuit 54a has no way of knowing whether this pulse 71 is or is not a true $T_0$ pulse, it assumes that it is a $T_0$ pulse and proceeds to prove or disprove this fact. The resulting detected $T_0$ pulse corresponding to the gamma-ray pulse 71 is shown in FIG. 4F.

This $T_0$ pulse from the $T_0$ detector 64 energizes the $t_4$ one-shot 65 to produce the first pulse of FIG. 4C. The rising edge of this $t_4$ pulse produces the corresponding positive differentiated pulse of FIG. 4D to reset the $T_0$ gate control flip-flop 61 and thus disable the $T_0$ gate 55. Since the $t_3$ and $t_4$ pulses are OR-ed together by the OR gate 58, the $T_0$ gate control flip-flop 61 cannot be set or reset during this pulse interval $t_4$. Thus, as seen by comparing FIGS. 4A and 4B, the $t_3$ retriggerable one-shot 57 will be responsive to subsequent dead times, including the dead time prior to the $T_0$ pulse of the sonic signal 73. However, the state of the $t_3$ retriggerable one-shot 57 will have no influence on the $T_0$ detection process until the $t_4$ pulse terminates, as indicated by the reference numeral 74 in FIG. 4C. However, since a termination of the $t_4$ pulse retriggers the $t_3$ retriggerable one-shot 57, the $T_0$ gate control flip-flop 61 will remain reset. As seen by comparing FIGS. 4A and 4B, gamma-ray pulses are still present on the cable at this time and thus the pulse 75 of FIG. 4B from the retriggerable one-shot 57 will continue to maintain the $T_0$ gate 55 disabled. However, upon termination of this pulse 75 of FIG. 4B, the $T_0$ gate control flip-flop 61 is set to again enable $T_0$ detection. Thus, the next pulse will be detected as a $T_0$ pulse. As seen in FIG. 4A, this next pulse, designated 76, is also a gamma-ray pulse ans a false $T_0$ detection has again occurred. In any event, this erroneous $T_0$ pulse will again set the $t_0$ one-shot 65 to reset the $T_0$ gate control flip-flop 61 and maintain it reset for at least a time interval $t_3+t_4$.

When this second $t_4$ pulse terminates, as indicated at 77, the retriggerable one-shot 57 is again energized and since gamma-ray pulses are present on the cable at this time, the retriggerable one-shot 57 will continue in its unstable state until a time interval $t_3$ after the next dead time. By so doing, the $T_0$ detection circuit 54a will move closer to detecting an authentic $T_0$ pulse, i.e., the circuit will, in effect, walk through the cable pulses moving closer to an authentic $T_0$ pulse each time a false one is detected. The reason for this is based on the random nature of the gamma-ray pulses.

As seen in FIG. 4A, the next dead time is the authentic or desired dead time between the last transmitted gamma-ray pulse prior to an authentic $T_0$ pulse. Thus, the retriggerable one-shot 57 will turn off, as indicated at the point 78 in FIG. 4B, thus enabling the $T_0$ gate as seen in FIGS. 4D and 4E. Then, the true $T_0$ pulse will pass through the $T_0$ gate 55 and be detected by the $T_0$ detector 64 and the $t_4$ one-shot 65 will again be energized. Since the time interval $t_3+t_4$ is slightly greater than the time interval between a transmitted $T_0$ pulse and the next dead period, the $T_0$ gate 55 will be enabled just prior to the arrival of each authentic $T_0$ pulse and thus, once the first authentic $T_0$ pulse is detected, the $T_0$ detection circuit 54a will become locked in on the $T_0$ pulses, i.e., it will be synchronized with the downhole electronics.

Each detected $T_0$ pulse energizes a "sonic kill one-shot" 80 which has a timing cycle substantially equal to the timing cycle of the downhole gamma-ray kill pulse of FIG. 3F. The resulting negative going sonic kill pulse is shown in FIG. 4G and is applied to the control terminal of a "sonic kill gate" 81 so that any signals on the cable will be blocked by the sonic kill gate 81 during the ontime of this sonic kill pulse of FIG. 4G. Since each detected $T_0$ pulse initiates this sonic signal kill operation, it can be seen by comparing FIGS. 4G and 4A (after the $T_0$ detection circuit 54a has become locked onto the authentic $T_0$ pulses), that the sonic kill gate 81 blocks only the sonic signals from being passed through to the gamma-ray circuits 82. This gamma-ray circuit 82 can include a suitable voltage discriminator which operates to discriminate against noise and detect only authentic gamma-ray pulses, as well as suitable frequency-to-amplitude converters for producing a DC output signal proportional to the gamma-ray count rate.

As stated earlier, the $T_0$ and $T_x$ pulses can be used to obtain a measure of the formation acoustic travel time. In one desirable manner, this is accomplished by subtracting the time interval which it takes an acoustic wave to travel from the transmitter T to the near receiver $R_1$, from the time for travel from the transmitter T to the far receiver $R_2$. As shown in U.S. Pat. No. 3,257,639 granted to F. P. Kokesh on June 21, 1966, a system having a 2 transmitter-2 receiver transducer array and utilizing 4 cycles of operation is especially suitable for such $\Delta t$ logging. To enable utilization of the Kokesh 4 cycle $\Delta t$ computing system with the apparatus of the present invention, the receiver identification logic circuits act to produce a 4 cycle operation event though only 2 cycles, in fact, exist.

To this end, the trailing edge of each $t_4$ pulse from the one-shot 65 energizes a divide-by-four counter 85 which changes state for each detected $T_0$ pulse up to a maximum count of four and then resets to zero. A logic circuit 86 is responsive to the output signals from the flip-flops of the divide-by-four counter 85 for producing an output signal on one of four output conductors depending on the state of the counter 85.

Figure 2:
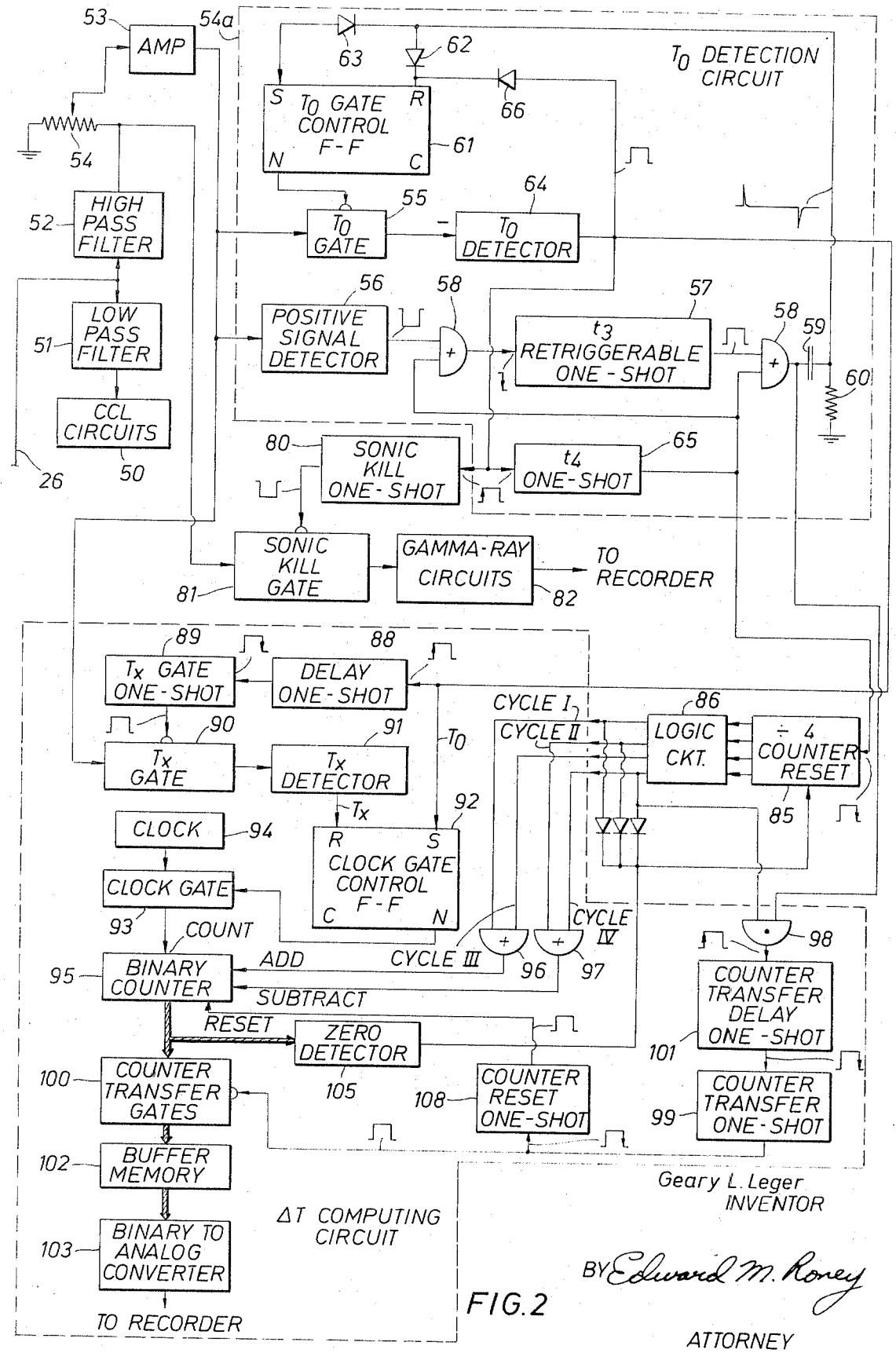
FIG. 2 is a schematic representation of the surface located electrical circuitry of the present invention.

Briefly, concerning how this measurement of $\Delta t$ takes place, in FIG. 2, each detected $T_0$ pulse energizes a delay one-shot 88 whose pulse trailing edge energizes a "$T_x$ gate one-shot" 89 to enable a "$T_x$ gate" 90. The delay time of the delay one-shot 88 is selected to place the output pulse from the one-shot 89 in timewise coincidence with the reception of a selected amplitude excursion of the acoustic receiver signal. A $T_x$ detector 91, e.g., a Schmitt trigger, produces an output pulse in response to each detected $T_x$ pulse for resetting a "clock gate control flip-flop" 92. This flip-flop 92 is set by each $T_0$ pulse and thus the normal output of this flip-flop 92 will be at the "1" level for the time interval between each $T_0$ pulse and the next subsequent $T_x$ pulse. The normal output of this clock gate control flip-flop 92 enables a "clock gate circuit" 93 to pass a plurality of high frequency clock pulses from a clock source 94 to a binary counter 95 such that a binary number will be entered into the binary counter 95 proportional to the travel time of the acoustic wave between the transmitter T and one of the receivers.

As is usually the case, cycles 1 and 3 correspond to the far receiver and cycles 2 and 4 correspond to the near receiver. Thus to insure that the binary counter 95 ends up with a net positive count, the cycle 1 and 3 output signals from the logic circuit 86 are applied via an OR gate 96 to the "add command" input of the binary counter 95 and the cycle 2 and 4 output signals are applied via an OR gate 97 to the "subtract command" input of the binary counter 95. Thus, since the counter 95 counts up during cycles 1 and 3 and down during cycles 2 and 4, the net count in counter 85 at the end of cycle 4 will be proportional to the travel time between the near and far receiver.

At the end of cycle 4, the positive going differentiated pulse from the non-grounded side of resistor 60 is combined in an AND gate 98 with the cycle 4 output signal from the logic circuit 86 cause a "counter transfer one-shot" 99 to energize a plurality of "counter transfer gates" (AND gates) 100 after a suitable time delay provided by a "counter transfer delay one-shot" 101. The resulting binary number is stored in a buffer memory 102 for use by a binary-to-analog converter 103 to produce an analog signal proportional to the acoustic travel time Δt. The trailing edge of this counter transfer pulse from one-shot 99 energizes a "counter reset one-shot" 108 which generates a pulse to reset the counter 95 after its contents have been transferred.

In the above-mentioned Kokesh patent, there are enough transmission channel (i.e., cable conductors) available such that the surface and downhole electronics can remain in synchronism with the particular cycle, i.e., the output signals from the logic circuit 86 in this Kokesh patent would be supplied in one form or another to the downhole electronics to keep it informed as to what cycle the surface apparatus is currently oeprating in. However in the present system, only one transmission channel is available and thus it is not possible for the surface and downhole electronics to remain synchronized on the same cycle of operation in this manner. To solve this problem, in accordance with another important feature of the present invention, a zero detector 105 is responsive to the output signals from the various stages of the binary counter 95 for detecting when the binary counter 95 reaches a state of zero net count. This zero detector 105 could take the form of an OR gate responsive to the normal output of each flip-flop in the binary counter 95 for producing a "0" output whenever all stages of the counter 95 are "0." This negative going signal from the zero detector 105 is utilized to reset the divide-by-four counter 85 to its proper state. The reason why this is possible is due to the fact that, except for the reset of counter 95 by one-shot 108, the only time that the counter should have a net count of "0" is if the cycles are reversed such that the counter is counting up during the near receiver cycle of operation and down during the far receiver cycle of operation. Since the counter 95 is reset to "0" during cycle 4 and it is counting up during cycles 1 and 3, only cycle 2 is checked for this "0" state condition. To prevent the divide-by-four or cycle counting counter 85 from being reset during cycles 1, 3, or 4, diodes 109, 110 and 111 are connected from the cycles 1, 3, and 4 outputs of logic circuit 86 to the reset input of counter 85 to prevent its reset during any cycle other than cycle 2.

It can therefore be seen that through utilization of the methods and apparatus of the present invention, both sonic and gamma-ray signals can be transmitted to the surface of the earth on one transmission channel and be accurately distinguished or separated from one another without the necessity of utilizing complicated transmission techniques such as time sharing. Moreover, in accordance with the present invention, the downhole and surface electronics circuitry of the sonic logging apparatus can be synchronized to the same cycle without the necessity of transmitting cycle identification signals between the well tool and surface located electronics.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. In a well logging system, apparatus for detecting a periodically occurring pulse transmitted from a remote location on the same transmission channel and frequency band with a plurality of other pulses and wherein said periodic pulse is always preceded by a dead period defined by an absence of transmitted pulses in said frequency band, comprising:
   means for receiving the transmitted pulses and passing all pulses on the frequency band of said periodic pulses;
   retriggerable pulse generating means responsive to at least a portion of said passed pulses for generating a first control signal having a first given time duration, said retriggerable means adapted to restart its timing cycle in response to each triggering pulse and said first given time duration being less than said dead period;
   detecting means responsive to an enabling signal for detecting a selected passed pulse as one of said periodic pulses; and
   enabling means responsive to each detected periodic pulse and said first control signal for producing said enabling signal to enable said detecting means during a time interval when one of said periodic pulses is expected.

2. The apparatus of claim 1 wherein said enabling means includes timing means responsive to each detected periodic pulse for producing a second control signal which terminates a second given time interval after said timing means is energized by one of said detected periodic pulses, said second given time interval being less than the time interval between successive ones of said periodic pulses; and means responsive to said first and second control signals for enabling said detecting means to detect a passed pulse as one of said periodic pulses.

3. In a well logging system, apparatus for detecting a periodically occurring pulse transmitted from a remote location on the same transmission channel and frequency band with a plurality of other pulses and wherein said periodic pulse is always preceded by a dead period defined by an absence of transmitted pulses in said frequency band, comprising:
   means for receiving the transmitted pulses and passing all pulses on the frequency band of said periodic pulses;
   detecting means responsive to an enabling signal for detecting a selected passed pulse as one of said periodic pulses;
   timing means responsive to each detected periodic pulse for producing a first control signal which terminates a first given time interval after said timing means is energized by one of said detected periodic pulses, said first given time interval being less than the time interval between successive ones of said periodic pulses;
   retriggerable pulse generating means responsive to at least a portion of said passed pulses and the trailing edge of each first control signal for generating a second control signal having a second given time duration, said retriggerable means adapted to restart its timing cycle in response to each triggering pulse and said second given time duration being less than said dead period; and
   enabling means responsive to said first and second control signals for generating said enabling signal to enable said detecting means to detect a passed pulse as one of said periodic pulses.

4. The apparatus of claim 3 wherein said enabling means includes means responsive to the absence of both of said first and second control signals for producing said enabling signal, and to the presence of either one of said control signal for inhibiting the generation of said control signal whereby a detected periodic pulse energizing said timing means will cause said detecting means to be enabled during a dead time period just prior to the arrival at the surface of the earth of the next one of said periodic pulses.

5. The apparatus of claim 4 wherein said enabling means further includes means responsive to each detected periodic pulse for inhibiting the generation of said enabling signal so that another pulse will not be detected as one of said periodic pulses until the next periodic pulse is expected.

6. In a well logging system of the type where energy is repetitively emitted from a transmitter and received by at least two nearby receivers which individually produce signals representative of the received energy for transmission to the surface of the earth on selected occurrences of energy emission, and wherein a sync pulse representative of the time of energy emission is also transmitted to the surface of the earth, apparatus for identifying the received energy signals at the surface of the earth, comprising:
   means for detecting each sync pulse;
   means for detecting each received energy signal;
   means for measuring the time interval between each detected sync pulse and a subsequent detected received energy signal and generating time interval pulses representative thereof; and
   identifying means responsive to said time interval signals for identifying which receiver produced each received energy signal.

7. The apparatus of claim 6 wherein said identifying means includes means for comparing the time interval pulses with one another and identifying said received energy signals in accordance with the relationship of the time interval pulses to one another.

8. In a well logging system of the type where energy is repetitively emitted from a transmitter and received by at least two nearby receivers which individually produce signals representative of the received energy for transmission to the surface of the earth on selected occurrences of energy emission, ans wherein a sync pulse representative of the time of energy emission is also transmitted to the surface of the earth, apparatus for identifying the received energy signals at the surface of the earth, comprising;
   means for detecting each sync pulse;
   means responsive to a selected portion of each received energy signal for generating a received energy timing pulse;
   means for measuring the time interval between each detected sync pulse and a subsequent received energy timing pulse and generating time interval pulses representative thereof;
   accumulating means responsive to said time interval pulses for adding or subtracting a function representative of each measured time interval to produce an accumulation signals;
   identifying means responsive to said detected sync pulses and adapted for producing signals representative of which receiver produced each received energy signal for application to said accumulating means to control whether said accumulating means adds or subtracts each of said functions; and
   means responsive to a selected condition of said accumulation signal for resetting said identifying means to a proper state whenever said identifying means inaccurately identifies said received energy signals.

9. A well logging system, comprising:
   a well tool having an energy emitting transmitter and at least two nearby energy receiving receivers;
   means for repetitively energizing said transmitter to emit energy into a media surrounding said well tool and producing a sync pulse representative of the time of energy emission for transmission to the surface of the earth;
   means coupled to said receivers and operable in synchronism with each energy emission for transmitting the signals developed by each receiver to the surface of the earth on selected emission of energy;
   means at the surface of the earth for detecting each transmitted sync pulse and receiver signal;
   means for measuring the time interval between each detected sync pulse and a subsequent detected received energy signal and generating a time interval pulse representative thereof; and
   identifying means responsive to a relationship of said time interval pulses to one another for identifying which receivers produced each receiver signal.

10. The apparatus of claim 9 wherein said identifying means includes accumulating means responsive to said time interval pulses for adding or subtracting a function representative of each measured time interval to produce an accumulation signal, means responsive to said detected sync pulses and a selected condition of said accumulation signal for identifying each receiver signal.

11. A well logging system, comprising:
   a well tool having an energy emitting transmitter and two nearby energy receiving receivers;
   means for repetitively energizing said transmitter to emit energy into a media surrounding said well tool and producing a sync pulse representative of the time of energy emission for transmission to the surface of the earth;
   means coupled to said receivers and operable in synchronism with each energy emission for transmitting the signals developed by each receiver to the surface of the earth on alternate emissions of energy;
   means at the surface of the earth for detecting each transmitted sync pulse and receiver signal;
   means for measuring the time interval between each detected sync pulse and a subsequent detected received energy signal and generating a time interval pulse representative thereof; and
   identifying means responsive to the relative time period of said time interval pulses to one another for identifying which receiver produced each receiver signal whereby the time period of the time interval pulse corresponding to the nearest receiver to said transmitter will be less than that corresponding to the farthest receiver therefrom to thereby enable said receiver signals to be identified.

12. The apparatus of claim 11 wherein said identifying means includes means responsive to said detected sync pulses for generating identification signals representative of which receiver produced each receiver signal;

accumulating means responsive to said time interval pulses and said identification signals for adding a function related to a time interval pulse which corresponds to the receiver signal from one of the receivers and subtracting a function related to a time interval pulse which corresponds to the receiver signal from the other of said receivers; and means responsive to a given state of said accumulating means for controlling said identification signal generating means to properly identify the receiver signals.

13. A well logging system, comprising:

a well tool having first and second exploring means, said first exploring means adapted to produce first pulses representative of a measured parameter for transmission to the surface of the earth, and said second exploring means having an energy emitting transmitter and at least two nearby energy receiving receivers, means for periodically energizing said transmitter to emit energy into a media surrounding the well tool and producing a sync pulse representative of the time of energy emission for transmission to the surface of the earth, means coupled to said receivers for transmitting receiver signals representative of the energy received by each receiver on selected emissions of energy, and means operable in synchronism with each energy emission for inhibiting the transmission of said first pulses from a selected time prior to the transmission of a sync pulse until a selected time subsequent to the transmission of a following receiver signal;

retriggerable pulse generating means at the surface of the earth responsive to at least a portion of said pulses for generating a first control signal having a first given time duration, said retriggerable means adapted to restart its timing cycle in response to each triggering pulse, said first given time duration being less than the transmission dead period during the time interval between the transmission of one of said first pulses and said sync pulse;

detecting means responsive to an enabling signal for detecting a selected one of said transmitted pulses at the surface of the earth as a sync pulse;

timing means responsive to said detected sync pulse for producing a second control signal which terminates a second given time interval after said timing means is energized by one of said detected sync pulses, said second given time interval being less than the time interval between successives ones of said sync pulses; and means responsive to said first and second control signals for enabling said detecting means to detect a pulse as one of said sync pulses.

14. The apparatus of claim 13 and further including means responsive to a given portion of each receiver signal for producing a receiver signal timing pulse, means for measuring the time interval between each detected sync pulse and a subsequent receiver signal timing pulse and generating time interval pulses representative thereof; and means responsive to said time interval pulses for identifying which receiver produced each receiver signal.

15. A method of identifying well logging signals produced by a well logging system of the type where energy is emitted from a transmitter and received by at least two nearby receivers which individually produce signals representative of the received energy for transmission to the surface of the earth on selected occurrences of energy emission, and wherein a sync pulse representative of the time of energy emission is also transmitted to the surface of the earth, comprising:

detecting each sync pulse;

detecting each received energy signal;

measuring the time interval between each detected sync pulse and a subsequent detected received energy signal and generating time interval pulses representative thereof; and identifying which receiver produced each received energy signal in response to a relationship of the time interval pulses to one another.

16. A method of identifying signals transmitted from a well logging tool of the type which repetitively emits energy from a transmitter and receives said energy with at least two nearby receivers which individually produce signals representative of the received energy for transmission to the surface of the earth on selected occurrences of energy emission, and which well tool also produces a sync pulse representative of the time of energy emission for transmission to the surface of the earth, comprising:

detecting each sync pulse;

generating a received energy timing pulse in response to a selected portion of each received energy signal;

measuring the time interval between each detected sync pulse and a subsequent received energy timing pulse;

adding or subtracting a function representative of each measured time interval in response to said detected sync pulses to produce an accumulation signal; and identifying which energy receiver in said well tool produced each of said received energy signals in response to the state of said accumulation signal.

17. A well logging method, comprising:

moving a well tool having an energy emitting transmitter and at least two nearby energy receiving receivers through a borehole;

repetitively energizing said transmitter to emit energy into a media surrounding said well tool and producing a sync pulse representative of the time of energy emission for transmission to the surface of the earth;

transmitting signals developed by each receiver in response to the emitted energy to the surface of the earth on selected, non-successive emissions of energy;

detecting each transmitted sync pulse and receiver signal at the surface of the earth;

measuring the time interval between each detected sync pulse and a subsequent detected received energy signal; and identifying which receiver produced each receiver signal in response to the relationship of said measured time intervals to one another.

18. The method of claim 17 wherein the stop of identifying the receiver signals includes adding or subtracting a function representative of each measured time interval to produce an accumulation signal, monitoring the condition of said accumulation signal to identify each receiver signal.

19. A well logging method, comprising:

moving a well tool having an energy emitting transmitter and two nearby energy receiving receivers through a borehole;

repetitively energizing said transmitter to emit energy into a media surrounding said well tool and producing a sync pulse representative of the time of energy emission for transmission to the surface of the earth;

transmitting signals developed by each receiver in response to the emitted energy to the surface of the earth on alternate emissions of energy;

detecting each transmitted sync pulse and receiver signal at the surface of the earth;

measuring the time interval between each detected sync pulse and a subsequent detected received energy signal; and monitoring the time period relationship of said measure time intervals to one another to identify which receiver produced each receiver signal whereby the time period of the measured time interval corresponding to the nearest receiver to said transmitter will be less than that corresponding to the farthest receiver therefrom to thereby enable said receiver signals to be identified.

20. The method of claim 19 wherein the step of monitoring includes generating identification signals representative of which receiver produced each receiver signal in response to said detected sync pulses, adding a function related to a time interval pulse which corresponds to the receiver signal from one of the receivers and subtracting a function related to a time interval pulse which corresponds to the receiver signal from the other of said receivers in response to said identification signals to produce an accumulation signal, monitoring the state of said accumulation signal and controlling the generation of said identification signals in response to said accumulation signal state so that said identification signals will properly identify the receiver signals.

* * * * *

UNITED STATES PATENT OFFICE
CERTIFICATE OF CORRECTION

Patent No. 3,783,444          Dated January 1, 1974

Inventor(s) Geary L. Leger

It is certified that error appears in the above-identified patent and that said Letters Patent are hereby corrected as shown below:

IN THE ABSTRACT:

Line 23, "repsonsive" should read --responsive--;

IN THE SPECIFICATION:

Column 7, line 16, "ans" should read --and--;

line 18, "$t_o$" should read --$t_4$--;

IN THE CLAIMS:

Claim 7, line 45, "ans" should read --and--;

Claim 18, line 61, "stop" should read -step--.

Signed and sealed this 17th day of September 1974.

(SEAL)
Attest:

McCOY M. GIBSON JR.
Attesting Officer

C. MARSHALL DANN
Commissioner of Patents